United States Patent
Yan et al.

(10) Patent No.: US 12,161,167 B2
(45) Date of Patent: Dec. 10, 2024

(54) ELECTRONIC CIGARETTE CONTROL METHOD AND ELECTRONIC CIGARETTE

(71) Applicant: SHENZHEN FIRST UNION TECHNOLOGY CO., LTD., Shenzhen (CN)

(72) Inventors: Huiyong Yan, Shenzhen (CN); Zhongli Xu, Shenzhen (CN); Yonghai Li, Shenzhen (CN)

(73) Assignee: SHENZHEN FIRST UNION TECHNOLOGY CO., LTD., Guangdong (CN)

( * ) Notice: Subject to any disclaimer, the term of this patent is extended or adjusted under 35 U.S.C. 154(b) by 879 days.

(21) Appl. No.: 17/277,765

(22) PCT Filed: Sep. 20, 2019

(86) PCT No.: PCT/CN2019/107034
§ 371 (c)(1),
(2) Date: Mar. 19, 2021

(87) PCT Pub. No.: WO2020/057640
PCT Pub. Date: Mar. 26, 2020

(65) Prior Publication Data
US 2021/0345682 A1    Nov. 11, 2021

(30) Foreign Application Priority Data
Sep. 21, 2018   (CN) .......................... 201811105752.9

(51) Int. Cl.
A24F 40/53    (2020.01)
A24F 40/10    (2020.01)
(Continued)

(52) U.S. Cl.
CPC .............. *A24F 40/53* (2020.01); *A24F 40/10* (2020.01); *A24F 40/60* (2020.01); *H04L 9/3226* (2013.01); *H04L 9/3239* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 8,176,549 B2 | 5/2012 | Lee et al. | |
| 10,912,335 B2 * | 2/2021 | Zitzke | ..................... A24F 40/50 |
| 2016/0331036 A1 | 11/2016 | Cameron | |

FOREIGN PATENT DOCUMENTS

| | | |
|---|---|---|
| CN | 102017578 A | 4/2011 |
| CN | 104106844 A | 10/2014 |

(Continued)

*Primary Examiner* — Ross N Gushi
(74) *Attorney, Agent, or Firm* — Proi Intellectual Property US

(57) ABSTRACT

An electronic cigarette control method and an electronic cigarette. The electronic cigarette includes an atomizer and a power device, the atomizer is provided with an encryption authentication unit, the power device is provided with a control unit, and when the atomizer is connected to the power device, the encryption authentication unit is in communication connection with the control unit; the electronic cigarette control method includes: generating a first identity authentication code; acquiring a second identity authentication code from the encryption authentication unit; performing identity authentication according to the first identity authentication code and the second identity authentication code; controlling the electronic cigaretteto activate if the identity authentication is passed; and prohibiting the electronic cigarette to activate if the identity authentication is not passed. The above method is capable of effectively prevent- (Continued)

ing the mixed use of the atomizer and the power device, thereby improving the user experience.

18 Claims, 8 Drawing Sheets

(51) Int. Cl.
*A24F 40/60* (2020.01)
*H04L 9/32* (2006.01)

(56) References Cited

FOREIGN PATENT DOCUMENTS

| | | | |
|---|---|---|---|
| CN | 105077592 | A | 11/2015 |
| CN | 105939620 | A | 9/2016 |
| CN | 105962427 | A | 9/2016 |
| CN | 106690422 | A | 5/2017 |
| CN | 106820274 | A | 6/2017 |
| CN | 107114825 | A | 9/2017 |
| CN | 107397255 | A | 11/2017 |
| CN | 107997239 | A | 5/2018 |
| CN | 109315837 | A | 2/2019 |
| JP | 2005198538 | A | 7/2005 |
| WO | 2018053689 | A1 | 9/2018 |

\* cited by examiner

ELECTRONIC CIGARETTE CONTROL METHOD AND ELECTRONIC CIGARETTE

This application claims priority to Chinese Patent Application entitled "Electronic cigarette control method and electronic cigarette" with application number of 2018111057529, submitted to China's State Intellectual Property Office on Sep. 21, 2018, the entire contents of which are incorporated herein by reference.

TECHNICAL FIELD

The embodiment of the present disclosure relates to the technical field of electronic cigarettes, and in particular to an electronic cigarette control method and an electronic cigarette.

BACKGROUND

Electronic cigarette is a product which can heat atomization substrates such as nicotine to generate an aerosol for a user to inhale. The electronic cigarette generally includes an atomizer and a power device. The power device supplies power to the atomizer so that the atomizer heats the atomization substrate to generate an aerosol. The atomizer and the power device can be in detachable connection, also can be in undetachable connection.

For the atomizer and the power device that are in detachable connection, it is easy to install different models or brands of atomizers and power devices together for use, which will easily cause confusions and errors in electronic cigarette functions and affect user experience and merchants' interests.

Therefore, how to prevent the mixed use of the atomizer and the power device is an urgent technical problem to be solved at present.

SUMMARY

The embodiment of the present disclosure aims to provide an electronic cigarette control method and an electronic cigarette, which can effectively prevent the mixed use of an atomizer and a power device through an identity authentication of the atomizer and the power device.

In order to solve the above technical problem, the embodiment of the present disclosure employs a technical scheme as follows. A control method for an electronic cigarette is provided, wherein the electronic cigarette includes an atomizer and a power device, the atomizer is provided with an encryption authentication unit, the power device is provided with a control unit, and when the atomizer is connected to the power device, the encryption authentication unit is in communication connection with the control unit;

the electronic cigarette control method includes:
generating a first identity authentication code;
acquiring a second identity authentication code from the encryption authentication unit; and
performing identity authentication according to the first identity authentication code and the second identity authentication code, controlling the electronic cigarette to activate if the identity authentication is passed, and prohibiting the electronic cigarette to activate if the identity authentication is not passed.

Optional, the step of generating a first identity authentication code includes:

generating a random challenge data;
acquiring prestored atomizer information from the encryption authentication unit; and
performing a calculation on the random challenge data, the prestored atomizer information and a prestored first key according to a prestored first encryption algorithm, to generate the first identity authentication code.

Optionally, before the step of acquiring a second identity authentication code from the encryption authentication unit, the method further includes:
sending the random challenge data to the encryption authentication unit, so that the encryption authentication unit performs a calculation on the random challenge data, the prestored atomizer information and a prestored second key according to a prestored second encryption algorithm, to generate the second identity authentication code.

Optionally, the prestored first encryption algorithm and the prestored second encryption algorithm are both secure Hash algorithms.

Optionally, the first identity authentication code and the second identity authentication code are both information validation codes or MAC codes.

Optionally, the prestored atomizer information includes manufacturer information, version information, production information and a tobacco liquid type.

Optionally, the step of performing identity authentication according to the first identity authentication code and the second identity authentication code includes:
comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

Optionally, the prestored atomizer information includes an available number of puffs, an available smoking duration and an available amount of tobacco liquid, wherein the method further includes:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

Optionally, the method further includes:
when the available amount of tobacco liquid is less than a preset threshold, controlling the electronic cigarette to stop working or controlling the electronic cigarette to give a prompt.

In order to solve the above technical problem, the embodiment of the present disclosure employs another technical scheme as follows. A control device for an electronic cigarette is provided, the electronic cigarette includes an atomizer and a power device, the atomizer is provided with an encryption authentication unit, the power device is provided with a control unit, and when the atomizer is connected to the power device, the encryption authentication unit is in communication connection with the control unit;

the control device of the electronic cigarette includes:
a first generation module configured for generating a first identity authentication code;
a first acquisition module configured for acquiring a second identity authentication code from the encryption authentication unit; and
a first control module configured for performing identity authentication according to the first identity authentication code and the second identity authentication code, controlling the electronic cigarette to activate if the identity authentication is passed, and
prohibiting the electronic cigarette to activate if the identity authentication is not passed.

Optionally, the first generation module specifically includes:
a second generation module configured for generating a random challenge data;
a second acquisition module configured for acquiring prestored atomizer information from the encryption authentication unit; and
a first calculation module configured for performing a calculation on the random challenge data, the prestored atomizer information and a prestored first key according to a prestored first encryption algorithm, to generate the first identity authentication code.

Optionally, the device further includes:
a sending module configured for sending the random challenge data to the encryption authentication unit before acquiring a second identity authentication code from the encryption authentication unit, so that the encryption authentication unit performs a calculation on the random challenge data, the prestored atomizer information and a prestored second key according to a prestored second encryption algorithm, to generate the second identity authentication code.

Optionally, the first control module specifically includes:
a comparison module configured for comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

Optionally, the prestored atomizer information includes an available number of puffs, an available smoking duration and an available amount of tobacco liquid, wherein the device further includes:
a third acquisition module configured for acquiring a number of times of smoking, a working duration of the atomizer and a working power of the atomizer when the electronic cigarette is controlled to activate;
a second calculation module configured for calculating a tobacco liquid consumption according to the working duration of the atomizer and the working power of the atomizer; and
an update module configured for updating the available amount of tobacco liquid, the available number of puffs and the available smoking duration according to the tobacco liquid consumption, the number of times of smoking and the working duration of the atomizer.

Optionally, the device further includes:
a second control module configured for controlling the electronic cigarette to stop working or controlling the electronic cigarette to give a prompt when the available amount of tobacco liquid is less than a preset threshold.

In order to solve the above technical problem, the embodiment of the present disclosure employs another technical scheme as follows. An atomizer is provided, which is in matched connection with a power device. The atomizer includes:
a heating element configured for atomizing an atomization substrate when electrified; and
an encryption authentication unit, which may be in communication connection with a control unit in the power device; the encryption authentication unit including an encryption module and a storage module, and the encryption module being connected to the storage module;
wherein the encryption module is configured for generating a second identity authentication code and feeding back to the control unit when the encryption authentication unit is in communication connection with the control unit in the power device.

In order to solve the above technical problem, the embodiment of the present disclosure employs another technical scheme as follows. An electronic cigarette is provided, which includes:
an atomizer, the atomizer including an encryption authentication unit; and
a power device, the power device including a control unit;
wherein the atomizer is connected to the power device, and the encryption authentication unit is in communication connection with the control unit;
the control unit includes at least one processor, and,
a memory in communication connection with the at least one processor, wherein
the memory stores an instruction that can be executed by the at least one processor, and the instruction is executed by the at least one processor so that the at least one processor can perform the method described above.

In order to solve the above technical problem, the embodiment of the present disclosure employs another technical scheme as follows. A non-volatile computer readable storage medium is provided, wherein the non-volatile computer readable storage medium stores a computer executable instruction, and the computer executable instruction is used for enabling the electronic cigarette to execute the above method.

The embodiment of the present disclosure has the following beneficial effects: different from the existing technology, the embodiment of the present disclosure provides an electronic cigarette control method and an electronic cigarette. The control method for the electronic cigarette controls the electronic cigarette to activate or prohibits the electronic cigarette to activate through performing identity authentication for a generated first identity authentication code and a second identity authentication code acquired from an encryption authentication unit; when the identity authentication is passed, the atomizer is matched with the power device and the electronic cigarette is controlled to activate; when the identity authentication is not passed, the atomizer is not matched with the power device and the electronic cigarette is prohibited to activate; this method effectively prevents the mixed use of the atomizer and the power device, improves user experience and guarantees merchants' interests.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

DETAILED DESCRIPTION

To make the purpose, the technical scheme and the advantages of the disclosure more apparent, a clear and complete description is provided to the technical scheme in the embodiment of the present disclosure in conjunction with the drawings in the embodiment of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It is to be noted that when an element is described as "fixed on" another element, it may be directly on the another element, or there might be one or more intermediate elements between them. When one element is described as "connected to" another element, it may be directly connected to the another element, or there might be one or more intermediate elements between them. Terms "vertical", "horizontal", "left", "right" and similar expressions used in this description are merely for illustration.

In addition, technical features involved in each embodiment of the present disclosure described below can be combined mutually if no conflict is incurred.

Embodiment 1

Figure 1:
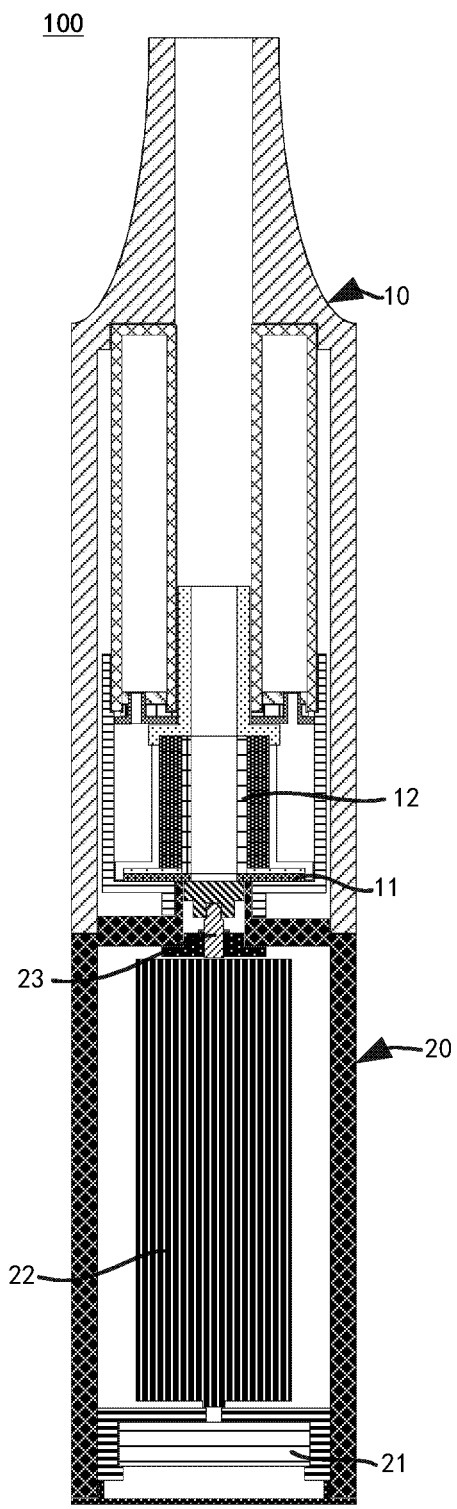
FIG. 1 is a structure diagram of an electronic cigarette provided in an embodiment of the present disclosure.

Referring to FIG. 1, which is a structure diagram of an electronic cigarette provided in an embodiment of the present disclosure. The electronic cigarette 100 includes: an atomizer 10 and a power device 20, the atomizer 10 and the power device 20 are in detachable connection, the power device 20 is configured for supplying power to the atomizer 10, and the atomizer 10 is heated according to the electrical energy provided by the power device 20 so as to heat an atomization substrate to generate an aerosol.

Specifically, the atomizer 10 is provided with an encryption authentication unit 11 and a heating element 12.

The encryption authentication unit 11 is provided at an end part of one end of the atomizer 10 for connecting to the power device 20, and includes an encryption module 111, a storage module 112 and a Printed Circuit Board (PCB) 113, wherein the encryption module 111 is connected to the storage module 112.

Herein, the encryption module 111 is an encryption chip; the storage module 112 is a memory chip or a memory space in the encryption chip.

Figure 2:
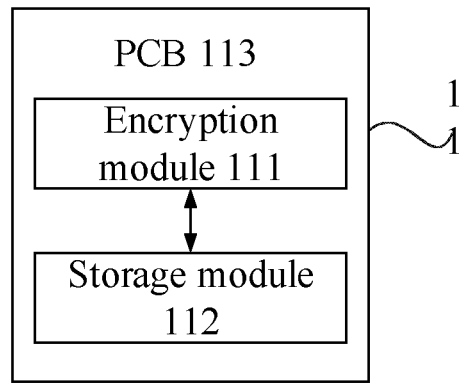
FIG. 2 is a structure diagram of an encryption authentication unit in an electronic cigarette shown in FIG. 1.
Figure 3:
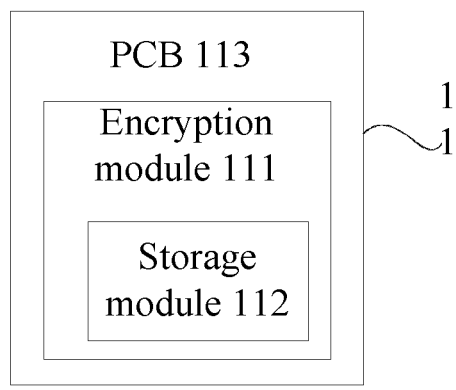
FIG. 3 is another structure diagram of an encryption authentication unit in an electronic cigarette shown in FIG. 1.

Referring to FIG. 2, when the storage module 112 is a memory chip, both the encryption chip and the memory chip are arranged on the PCB 113.

Referring to FIG. 2, when the storage module 112 is a memory space in the encryption chip, the encryption chip is arranged on the PCB 113.

The encryption module 111 is configured for storing a prestored second key and a prestored second encryption algorithm and is further configured for generating a second identity authentication code.

The storage module 112 is configured for storing prestored atomizer information, wherein the prestored atomizer information includes manufacturer information, version information, production information, a tobacco liquid type, an available number of puffs, an available smoking duration, an available amount of tobacco liquid, etc.

The heating element 12 is arranged inside the atomizer 10. The heating element 12 may be an element capable of being electrified to generate heat, such as a heating coil, a heating piece, etc., and is configured for atomizing an atomization substrate to generate an aerosol after being heated.

When the atomizer 10 is connected to the power device 20, both the encryption authentication unit 11 and the heating element 12 are connected and conducted to the power device 20; the power device 20 can supply power to the encryption authentication unit 11 and the heating element 12, such that the encryption authentication unit 11 can carry out the method of generating a second identity authentication code; the heating element 12 can be heated to heat an atomization substrate to generate an aerosol.

The power device 20 includes a control unit 21, a power supply 22 and a connection piece 23, wherein the control unit 21, the power supply 22 and the connection piece 23 are mutually connected.

Herein, the control unit 21 may be an electronic component capable of completing coordination and command system work, such as a controller.

The control unit 21 is configured for storing a prestored first encryption algorithm and a prestored first key, and is further configured for carrying out the electronic cigarette control method to perform identity authentication for the atomizer 10 and the power device 20 and to control the operation state of the electronic cigarette according to the identity authentication result.

The power supply 22 may be a chemical power supply, for example, a dry cell, a lead-acid accumulator, a lithium-ion battery, etc.; when the atomizer 10 is connected to the power device 20, the power supply 22 is configured for supplying power to the atomizer 10, such that the atomizer 10 heats an atomization substrate to generate an aerosol.

The connection piece 23 is arranged at an end part of one end of the power device 20 for connecting to the atomizer 10; the connection piece 23 may be a component capable of realizing circuit conduction, such as a spring plunger, an elastic piece and a golden finger.

Figure 4:
FIG. 4 is a diagram of a connection structure between an encryption authentication unit and a control unit.

When the atomizer 10 is connected to the power device 20, the encryption authentication unit 11 is connected to the connection piece 23, such that the encryption authentication unit 11 is conducted to the power supply 22 and the control unit 21 through the connection piece 23; meanwhile, the power supply 22 can supply power to the encryption authentication unit 11, the encryption authentication unit 11 is in communication connection with the control unit 21 (as shown in FIG. 4), such that the control unit 21 can perform identity authentication using a second identity authentication code generated by the encryption authentication unit 11; the heating element 12 is connected to the power supply 22, and the control unit 21 controls the power output from the power supply 22 to the heating element 12, so as to control the heating condition of the heating element 12, that is, to control the operation state of the electronic cigarette, including controlling the electronic cigarette to activate and prohibiting the electronic cigarette to activate.

Herein, the encryption authentication unit 11 can perform wired communication connection or wireless communication connection with the control unit 21. The wired communication connection includes I2C bus, 1-Wie bus and the like; and the wireless the wired communication connection includes Bluetooth, 3G, 4G, WiFi and the like.

After the encryption authentication unit 11 is in communication connection with the control unit 21, the control unit 21 carries out the electronic cigarette control method, to perform identity authentication for the atomizer 10 and the power device 20 and control the operation state of the electronic cigarette according to the identity authentication result. Specifically:

the control unit 21 generates a first identity authentication code, and acquires a second identity authentication code from the encryption authentication unit 11, and then the control unit 21 performs identity authentication according to the first identity authentication code and the second identity authentication code, controls the electronic cigarette to activate if the identity authentication is passed, and prohibits the electronic cigarette to activate if the identity authentication is not passed.

Herein, the step of the control unit 21 generating a first identity authentication code specifically includes: the control unit 21 generates a random challenge data, and acquires prestored atomizer information from the encryption authentication unit 11, wherein the prestored atomizer information includes manufacturer information, version information, production information, a tobacco liquid type, etc.; and then the control unit 21 performs a calculation on the random challenge data, the acquired prestored atomizer information and a prestored first key according to a prestored first encryption algorithm, to generate the first identity authentication code.

Meanwhile, the control unit 21 further sends the generated random challenge data to the encryption authentication unit 11, so that the encryption authentication unit 11 performs a calculation on the prestored atomizer information, a prestored second key and the received random challenge data according to a prestored second encryption algorithm, to generate the second identity authentication code; meanwhile, the second identity authentication code generated by the encryption authentication unit 11 is the second identity authentication code that the control unit 21 needs to acquire.

During the process of the encryption authentication unit 11 generating the second identity authentication code, the prestored atomizer information includes manufacturer information, version information, production information, a tobacco liquid type, etc.

Further, the prestored first encryption algorithm and the prestored second encryption algorithm are both secure Hash algorithms (SHA). Preferably, the first encryption algorithm and the second encryption algorithm are SHA-256.

The first identity authentication code and the second identity authentication code are information validation codes or MAC codes, which are both calculated based on the prestored atomizer information; therefore, the first identity authentication code and the second identity authentication code represent the identity of one same atomizer. The first identity authentication code is calculated at the power device 20 end through the prestored first key and the acquired prestored atomizer information, while the second identity authentication code is calculated at the atomizer 10 end through the prestored second key and the prestored atomizer information, that is to say, the first identity authentication code and the second identity authentication code represent the identity of the atomizer from the power device 20 end and the atomizer 10 end respectively; when the first identity authentication code and the second identity authentication code are matched, the prestored first key and the prestored second key are matched, which indicates that the power device 20 and the atomizer 10 are matched; therefore, the identity authentication of the power device 20 and the atomizer 10 can be performed through the first identity authentication code and the second identity authentication code.

Preferably, the power device 20 and the atomizer 10 are determined to be matched when the prestored first key and the prestored second key are totally the same; meanwhile, the first identity authentication code and the second identity authentication code should be totally the same. Therefore, the step of the control unit 21 performing identity authentication according to the first identity authentication code and the second identity authentication code specifically includes:

the control unit 21 compares the first identity authentication code with the second identity authentication code; if the first identity authentication code and the second identity authentication code are consistent, the identity authentication is passed; the control unit 21 controls the power supply 22 to output a specified power to the heating element 12 to enable the heating element 12 to be heated, then the electronic cigarette is activated; if the first identity authentication code and the second identity authentication code are inconsistent, the identity authentication is not passed; the control unit 21 controls the power supply 22 to output a zero power to the heating element 12 to enable the heating element 12 not to be heated, then the electronic cigarette is prohibited to activate.

Further, the control unit 21 generates a first identity authentication code and acquires a second identity authentication code from the encryption authentication unit 11 when receiving an activation command, and then completes the identity authentication of the atomizer 10 and the power device 20. Herein, the activation command is a command generated when a user presses an ignition button of the electronic cigarette.

Of course, in some alternative embodiments, the control unit 21 can generate a first identity authentication code and acquire a second identity authentication code from the encryption authentication unit 11 when it is in communication connection with the encryption authentication unit 11, and then completes the identity authentication of the atomizer 10 and the power device 20.

Of course, in some other alternative embodiments, the control unit 21 can generate a first identity authentication code and acquire a second identity authentication code from the encryption authentication unit 11 according to a preset time interval, and then completes the identity authentication of the atomizer 10 and the power device 20.

Further, if the identity authentication is passed, when the control unit 21 controls the electronic cigarette to activate, the control unit 21 can acquire a number of times of smoking, a working duration of the atomizer and a working power of the atomizer, and calculate a tobacco liquid consumption according to the working duration of the atomizer and the working power of the atomizer; and then the control unit 21 updates the acquired prestored atomizer information, including the available number of puffs, the available smoking duration and the available amount of tobacco liquid, according to the acquired number of times of smoking, the acquired working duration of the atomizer and the calculated tobacco liquid consumption.

Further, after the control unit 21 updates the available number of puffs, the available smoking duration and the available amount of tobacco liquid, it sends the available number of puffs, the available smoking duration and the available amount of tobacco liquid that are updated to the encryption authentication unit 11 to store, so as to replace the available number of puffs, the available smoking duration and the available amount of tobacco liquid that are originally stored in the encryption authentication unit 11.

Further, each time the control unit 21 turns on the electronic cigarette or turns off the electronic cigarette, the control unit 21 acquires the available amount of tobacco liquid stored in the encryption authentication unit 11, and compares the acquired available amount of tobacco liquid with a preset threshold; when the available amount of tobacco liquid is less than the preset threshold, the control unit 21 controls the electronic cigarette to stop working, that is, the control unit 21 controls the power supply 22 to output a zero power to the heating element 12.

Of course, in some embodiments, a prompt device is arranged in the electronic cigarette, and the control unit 21 can control the prompt device to give a prompt when the available amount of tobacco liquid is less than the preset threshold. The prompt device may be a loudspeaker capable of making a prompt voice, also may be a buzzer capable of giving an alarm voice, and the like.

Further, in some embodiments, the control unit 21 can analyze the smoking habits of a user to generate a smoking report and a healthy smoking suggestion report, according to the number of times of smoking, the working duration of the atomizer, the working power of the atomizer, the tobacco liquid consumption, the tobacco liquid type and the like in each operation process, and sends the generated smoking report and healthy smoking suggestion report to a mobile terminal through establishing a communication connection with the mobile terminal, so that the user can better use the electronic cigarette. Thus, the user experience is improved.

The embodiment of the present disclosure provides an electronic cigarette, wherein an encryption authentication unit is arranged in an atomizer of the electronic cigarette and a control unit is arranged in a power device, and the encryption authentication unit is in communication connection with the control unit when the atomizer is connected to the power device, such that the control unit carries out the electronic cigarette control method to perform identity authentication for the atomizer and the power device, which effectively prevents the mixed use of the atomizer and the power device, improves the user experience and guarantees the merchants' interests.

Embodiment 2

Figure 5:
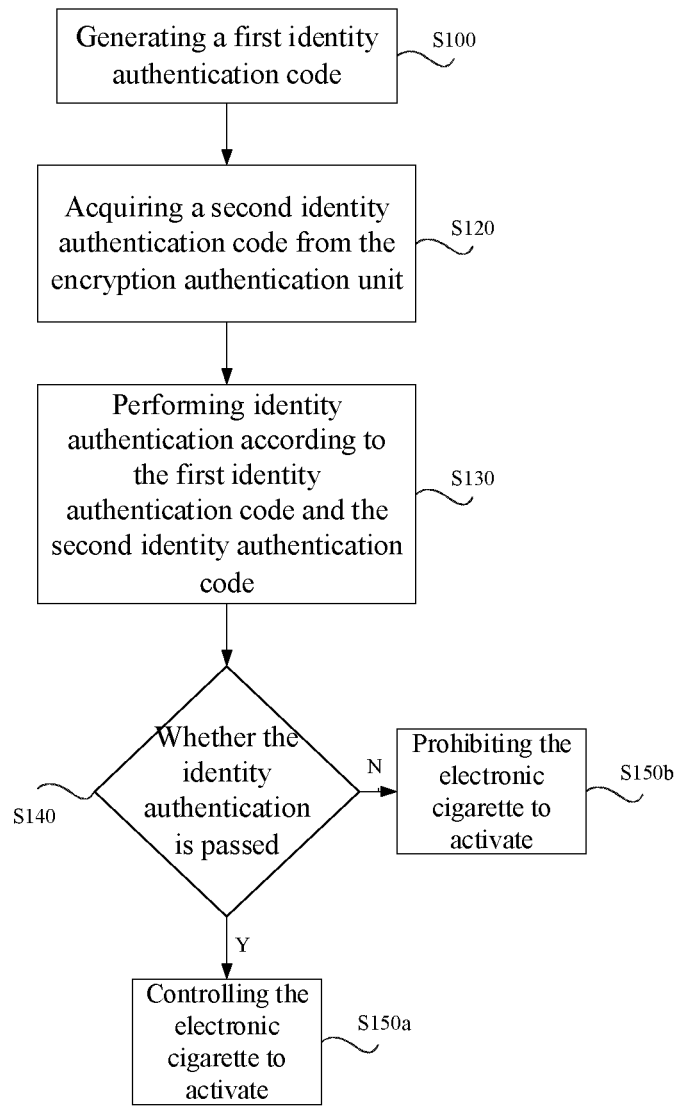
FIG. 5 is a flowchart of an electronic cigarette control method provided in an embodiment of the present disclosure.

Referring to FIG. 5, which is a flowchart of an electronic cigarette control method provided in an embodiment of the present disclosure; the electronic cigarette control method is applied to an electronic cigarette; the electronic cigarette is the electronic cigarette described in the above embodiments, and the method provided in the embodiment of the present disclosure is carried out by a control unit 21 in the electronic cigarette, to perform identity authentication for the atomizer and the power device. The control method for the electronic cigarette includes:

S100: generating a first identity authentication code.

The above first identity authentication code is an information validation code or MAC code generated and calculated at the power device end, which can represent the identity of the atomizer from the power device end.

Figure 6:
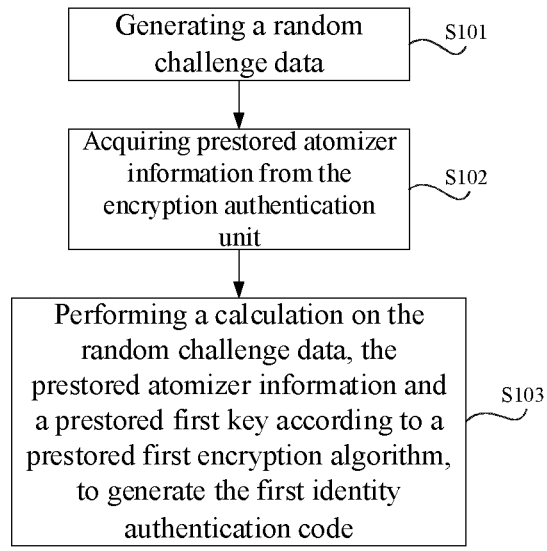
FIG. 6 is a method flowchart of S100.

Referring to FIG. 6, the above step of generating a first identity authentication code specifically includes:

S101: generating a random challenge data.

The above random challenge data is a random number generated for challenge in a challenge-response mechanism. The random challenge data generated each time is not fixed.

S102: acquiring prestored atomizer information from the encryption authentication unit.

The above prestored atomizer information is the basic information of the atomizer stored in the encryption authentication unit of the atomizer, including manufacturer information, version information, production information, a tobacco liquid type, etc.

S103: performing a calculation on the random challenge data, the prestored atomizer information and a prestored first key according to a prestored first encryption algorithm, to generate the first identity authentication code.

The above prestored first encryption algorithm is a SHA stored in the control unit of the power device. The prestored first encryption algorithm is a SHA-256.

The SHA-256 is used to perform a calculation on the random challenge data, the prestored atomizer information and the prestored first key to generate the first identity authentication code. Since the random challenge data is randomly generated, the first identity authentication code calculated each time is not a fixed value and varies depending on the random challenge data.

S120: acquiring a second identity authentication code from the encryption authentication unit.

The above second identity authentication code is an information validation code or MAC code generated and calculated at the atomizer end, which can represent the identity of the atomizer from the atomizer end.

Figure 7:
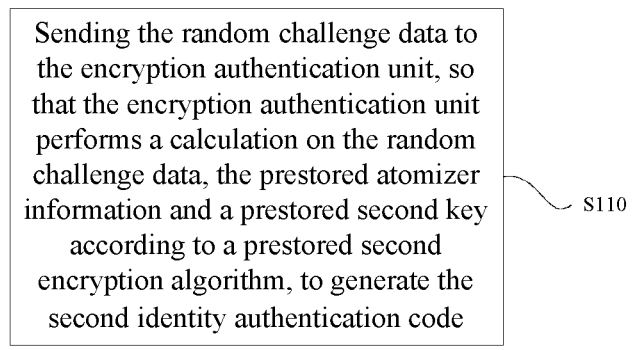
FIG. 7 is a partial flowchart of an electronic cigarette control method provided in another embodiment of the present disclosure.

Referring to FIG. 7, before S120, the control method for the electronic cigarette further includes:

S110: sending the random challenge data to the encryption authentication unit, so that the encryption authentication unit performs a calculation on the random challenge data, the prestored atomizer information and a prestored second key according to a prestored second encryption algorithm, to generate the second identity authentication code.

The above prestored atomizer information is the basic information of the atomizer stored in the encryption authentication unit of the atomizer, including manufacturer information, version information, production information, a tobacco liquid type, etc.

The above prestored second encryption algorithm is a SHA stored in the control unit of the power device. The prestored second encryption algorithm is a SHA-256.

The SHA-256 is used to perform a calculation on the random challenge data, the prestored atomizer information and the prestored second key to generate the second identity authentication code.

Since the random challenge data is of strong randomness, in order to guarantee that the match between the first identity authentication code and the second identity authentication code is related to the match between the first key and the second key, the random challenge data used to generate the first identity authentication code is sent to the encryption authentication unit, such that the encryption authentication unit calculates the second identity authentication code using the same random challenge data. Meanwhile, if the first identity authentication code is matched with the second identity authentication code, then the prestored first key is matched with the prestored second key, which means the power device is matched with the atomizer; therefore, the identity authentication of the power device 20 and the atomizer 10 can be performed through the first identity authentication code and the second identity authentication code.

In some embodiments, when an activation command is received, a first identity authentication code is generated and a second identity authentication code is acquired from the encryption authentication unit.

Of course, in some alternative embodiments, when the control unit and the encryption authentication unit are in communication connection, a first identity authentication code is generated and a second identity authentication code is acquired from the encryption authentication unit.

Of course, in some other alternative embodiments, a first identity authentication code is generated and a second identity authentication code is acquired from the encryption authentication unit according to a preset time interval.

S130: performing identity authentication according to the first identity authentication code and the second identity authentication code.

Figure 8:
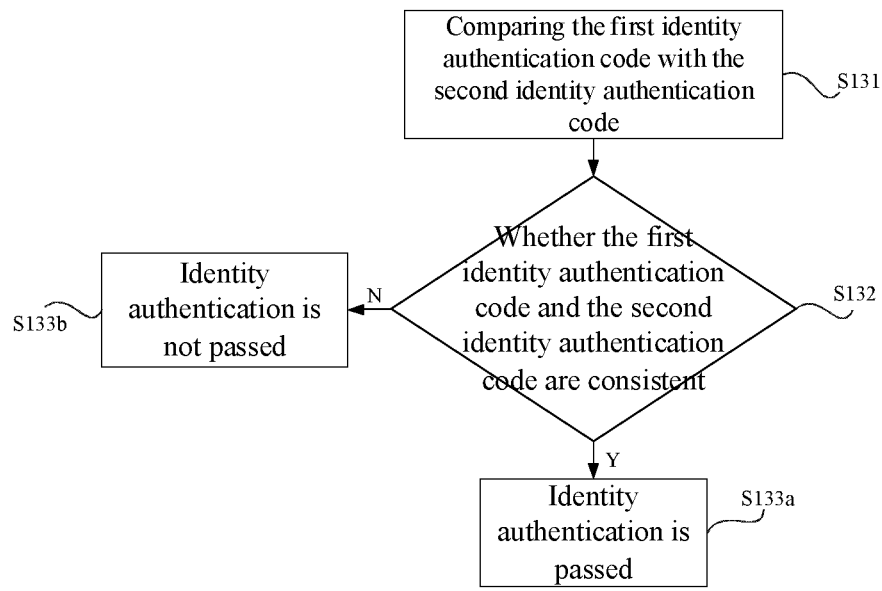
FIG. 8 is a method flowchart of S130.

Referring to FIG. 8, the above step of performing identity authentication according to the first identity authentication code and the second identity authentication code specifically includes:

S131: comparing the first identity authentication code with the second identity authentication code.

S132: judging whether the first identity authentication code and the second identity authentication code are consistent.

S133a: if the first identity authentication code and the second identity authentication code are consistent, the identity authentication is passed.

S133b: if the first identity authentication code and the second identity authentication code are inconsistent, the identity authentication is not passed.

In the embodiment of the present disclosure, the power device and the atomizer are determined to be matched when the prestored first key and the prestored second key are totally the same; meanwhile, the first identity authentication code and the second identity authentication code are the same; therefore, when performing identity authentication according to the first identity authentication code and the second identity authentication code, it is needed to compare whether the first identity authentication code and the second identity authentication code are the same.

S140: judging whether the identity authentication is passed.

S150a: controlling the electronic cigarette to activate if the identity authentication is passed.

S150b: prohibiting the electronic cigarette to activate if the identity authentication is not passed.

It is judged whether the identity authentication is passed through judging whether the first identity authentication code and the second identity authentication code are consistent. If the first identity authentication code and the second identity authentication code are consistent, the identity authentication is passed, and the electronic cigarette is controlled to activate. If the first identity authentication code and the second identity authentication code are inconsistent, the identity authentication is not passed, and the electronic cigarette is prohibited to activate.

Figure 9:
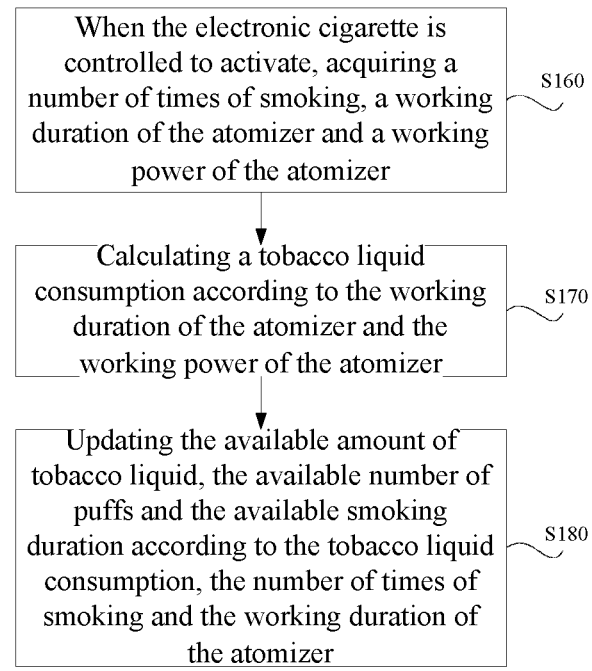
FIG. 9 is a partial flowchart of an electronic cigarette control method provided in still another embodiment of the present disclosure.

Further, referring to FIG. 9, in some embodiments, the control method for the electronic cigarette further includes:

S160: when the electronic cigarette is controlled to activate, acquiring a number of times of smoking, a working duration of the atomizer and a working power of the atomizer.

The above number of times of smoking refers to a number of puffs that the user takes during a process from the startup to the shutdown of the electronic cigarette, the number of times of smoking can be calculated through a change curve of air flow, each peak or trough is counted as one time. The number of times of smoking can be acquired using a flow sensor.

The above working duration of the atomizer refers to a time from the user turning on the electronic cigarette to the user turning off the electronic cigarette, the working duration of the atomizer can be acquired using a timer, the time starts timing when the electronic cigarette is turned on and the timer stops timing when the electronic cigarette is turned off, and the difference of time is the working duration of the atomizer.

The above working power of the atomizer refer to a power output from the power supply to the heating element during a process from the startup to the shutdown of the electronic cigarette.

S170: calculating a tobacco liquid consumption according to the working duration of the atomizer and the working power of the atomizer.

The above tobacco liquid consumption refers to an amount of tobacco liquid used during the operation process of the electronic cigarette, and it can be calculated through the working duration of the atomizer and the working power of the atomizer during the current working duration.

S180: updating the available amount of tobacco liquid, the available number of puffs and the available smoking duration according to the tobacco liquid consumption, the number of times of smoking and the working duration of the atomizer.

The prestored atomizer information further includes an available number of puffs, an available smoking duration and an available amount of tobacco liquid.

After the end of each operation process of the electronic cigarette, the available number of puffs in the acquired prestored atomizer information is updated according to the acquired number of times of smoking, specifically, subtracting the number of times of smoking from the available number of puffs; the available smoking duration in the acquired prestored atomizer information is updated according to the acquired working duration of the atomizer, specifically, subtracting the working duration of the atomizer from the available smoking duration; the available amount of tobacco liquid in the acquired prestored atomizer information is updated according to the acquired tobacco liquid consumption, specifically, subtracting the tobacco liquid consumption from the available amount of tobacco liquid.

Then, the available number of puffs, the available smoking duration and the available amount of tobacco liquid that are updated are sent to the encryption authentication unit 11 to store, so as to replace the available number of puffs, the available smoking duration and the available amount of tobacco liquid that are originally stored in the encryption authentication unit 11.

Of course, in some embodiments, the method can analyze the smoking habits of a user to generate a smoking report and a healthy smoking suggestion report, according to the number of times of smoking, the working duration of the atomizer, the working power of the atomizer, the tobacco liquid consumption, the tobacco liquid type and the like in each operation process of the electronic cigarette, and sends the generated smoking report and healthy smoking suggestion report to a mobile terminal through establishing a communication connection with the mobile terminal, so that the user can better use the electronic cigarette. Thus, the user experience is improved.

Figure 10:
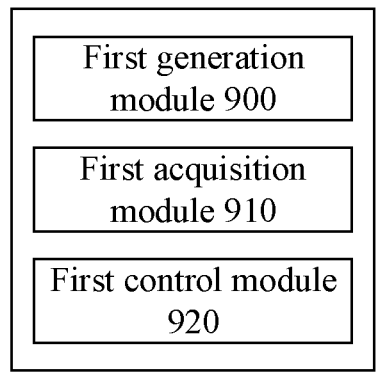
FIG. 10 is a partial flowchart of an electronic cigarette control method provided in yet another embodiment of the present disclosure.

Further, referring to FIG. 10, in some embodiments, the control method for the electronic cigarette further includes:

S190: when the available amount of tobacco liquid is less than a preset threshold, controlling the electronic cigarette to stop working or controlling the electronic cigarette to give a prompt.

The above preset threshold is a preset minimum amount of tobacco liquid which can prevent the electronic cigarette from dry burning.

Each time the electronic cigarette is turned on or turned off, the available amount of tobacco liquid stored in the encryption authentication unit is acquired, and the acquired available amount of tobacco liquid is compared with a preset threshold; when the available amount of tobacco liquid is less than the preset threshold, the electronic cigarette is controlled to stop working, or the prompt device is controlled to give a prompt. Herein, the prompt device may be a loudspeaker arranged in the electronic cigarette capable of making a prompt voice, also may be a buzzer arranged in the electronic cigarette capable of giving an alarm voice, and the like.

The embodiment of the present disclosure provides a control method for an electronic cigarette, which controls the electronic cigarette to activate or prohibits the electronic cigarette to activate through performing identity authentication for the generated first identity authentication code and the second identity authentication code acquired from the encryption authentication unit, thus effectively prevents the mixed use of the atomizer and the power device, improves the user experience and guarantees the merchants' interests.

Embodiment 3

Figure 11:
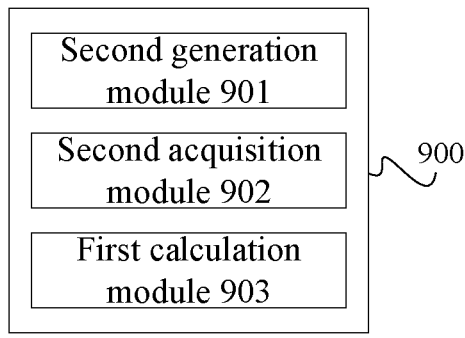
FIG. 11 is a structure diagram of an electronic cigarette control device provided in an embodiment of the present disclosure.

Referring to FIG. 11, which is a structure diagram of an electronic cigarette control device provided in an embodiment of the present disclosure. The control device is applied to an electronic cigarette. The electronic cigarette is the electronic cigarette described in the above embodiments, however, the functions of each module of the device provided in the embodiment of the present disclosure are executed by the above control unit, so as to perform identity authentication for the atomizer and the power device. The control device for the electronic cigarette includes:

a first generation module 900, which is configured for generating a first identity authentication code;

a first acquisition module 910, which is configured for acquiring a second identity authentication code from the encryption authentication unit; and a first control module 920, which is configured for performing identity authentication according to the first identity authentication code and the second identity authentication code, controlling the electronic cigarette to activate if the identity authentication is passed, and prohibiting the electronic cigarette to activate if the identity authentication is not passed.

Figure 12:
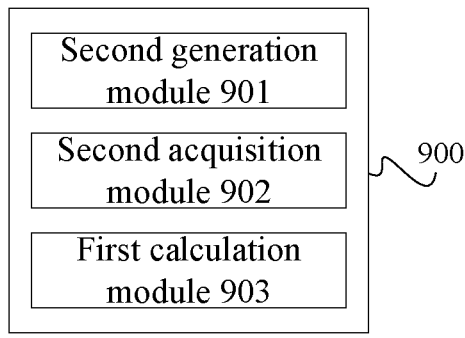
FIG. 12 is a structure diagram of a first generation module shown in FIG. 11.

Referring to FIG. 12, the first generation module 900 further includes:

a second generation module 901, which is configured for generating a random challenge data;

a second acquisition module 902, which is configured for acquiring prestored atomizer information from the encryption authentication unit; and a first calculation module 903, which is configured for performing a calculation on the random challenge data, the prestored atomizer information and a prestored first key according to a prestored first encryption algorithm, to generate the first identity authentication code.

Figure 13:
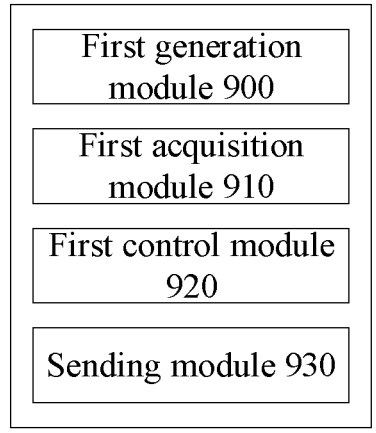
FIG. 13 is a structure diagram of an electronic cigarette control device provided in another embodiment of the present disclosure.

Referring to FIG. 13, the control device for the electronic cigarette further includes:

a sending module 930, which is configured for sending the random challenge data to the encryption authentication unit, so that the encryption authentication unit performs a calculation on the random challenge data, the prestored atomizer information and a prestored second key according to a prestored second encryption algorithm, to generate the second identity authentication code.

Figure 14:
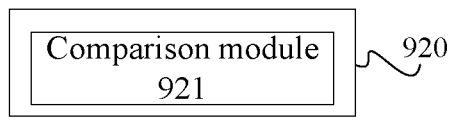
FIG. 14 is a structure diagram of a first control module shown in FIG. 11.

Referring to FIG. 14, the first control module 920 includes:

a comparison module 921, which is configured for comparing the first identity authentication code with the second identity authentication code; if the first identity authentication code and the second identity authentication code are consistent, the identity authentication is passed;

if the first identity authentication code and the second identity authentication code are inconsistent, the identity authentication is not passed.

Figure 15:
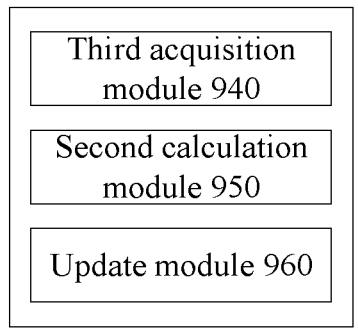
FIG. 15 is a partial structure diagram of an electronic cigarette control device provided in still another embodiment of the present disclosure.

Referring to FIG. 15, the control device for the electronic cigarette further includes:

a third acquisition module 940, which is configured for acquiring a number of times of smoking, a working duration of the atomizer and a working power of the atomizer when the electronic cigarette is controlled to activate;

a second calculation module 950, which is configured for calculating a tobacco liquid consumption according to the working duration of the atomizer and the working power of the atomizer; and an update module 960, which is configured for updating the available amount of tobacco liquid, the available number of puffs and the available smoking duration according to the tobacco liquid consumption, the number of times of smoking and the working duration of the atomizer.

Figure 16:
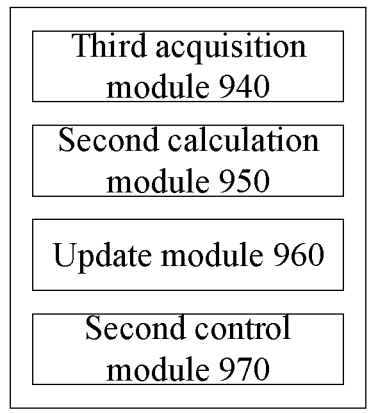
FIG. 16 is a partial structure diagram of an electronic cigarette control device provided in yet another embodiment of the present disclosure.

Referring to FIG. 16, the control device for the electronic cigarette further includes:

a second control module 970, which is configured for controlling the electronic cigarette to stop working or controlling the electronic cigarette to give a prompt when the available amount of tobacco liquid is less than a preset threshold.

Since the device embodiments and the method embodiments are based on one same idea, the contents of the device embodiments may refer to those of the method embodiments if no conflict is incurred. No repeated description is needed here.

The embodiment of the present disclosure provides a control device for an electronic cigarette, which is capable of effectively preventing the mixed use of the atomizer and the power device, thereby improving the user experience and guaranteeing the merchants' interests.

Embodiment 4

Figure 17:
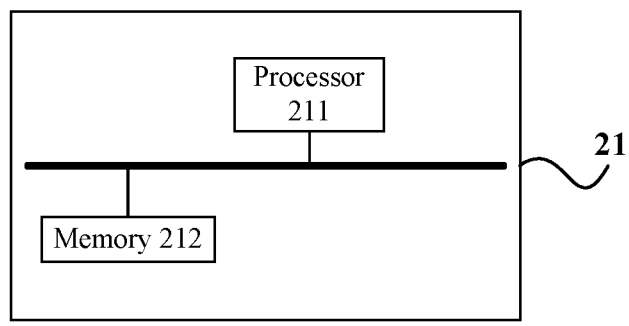
FIG. 17 is a diagram of a hardware structure of a control unit shown in FIG. 1.

Referring to FIG. 17, which is a diagram of a hardware structure of the control unit shown in FIG. 1, the control unit 21 is capable of executing the control method described in the above embodiments, and can also implement the functions of each module of the control device described in the above embodiments.

As shown in FIG. 17, the control unit 21 includes:

one or more processors 211 and a memory 212, wherein FIG. 17 takes one processor 211 for example.

The processor 211 and the memory 212 may be connected through a bus or other modes, and FIG. 17 takes a bus connection for example.

The memory 212, as a non-volatile computer readable storage medium, may be used for storing non-volatile software programs, non-volatile computer executable programs and modules, for example, a program instruction corresponding to the control method for the electronic cigarette provided in the above embodiment of the present disclosure and a module corresponding to the control device for the electronic cigarette (for example, the first generation module 900, the first acquisition module 910 and the first control module 920, etc.). The processor 211 executes various function application and data processing of the control method for the electronic cigarette, that is, implementing the control method for the electronic cigarette in the above method embodiment and the functions of each module of the above device embodiment, through running the non-volatile software programs, instructions and modules stored in the memory 212.

The memory 212 may include a program storage area and a data storage area, wherein the program storage area can store the application needed by an operating system or at least one function, and the data storage area can store data and the like created according to the control device for the electronic cigarette.

The data storage area further stores preset data, including a prestored first encryption algorithm, a prestored first key and a preset threshold, etc.

In addition, the memory 212 may include a high speed random access memory, and may further include a nonvolatile memory, for example, at least one disk storage device, a flash memory device or other solid-state nonvolatile storage devices. In some embodiments, the memory 212 optionally includes a remote memory relative to the processor 211. The remote memory can be connected to the processor 211 through a network. Instances of the above network include but not limited to Internet, intranet, local area network, mobile communication network and combinations thereof.

The program instruction and the one or more modules are stored in the memory 212 and, when executed by the one or more processors 211, will execute each step of the control method for the electronic cigarette in any one of the above method embodiments, or implement the functions of each module of the control device for the electronic cigarette in any one of the above device embodiments.

The above product can execute the method provided by the embodiment of the present disclosure and has corresponding function modules and beneficial effects to execute the method. Technical details that are not described in detail in the present embodiment can refer to the method provided by the embodiment of the disclosure.

The embodiment of the present disclosure provides a nonvolatile computer readable storage medium, the computer readable storage medium stores a computer executable instruction, and the computer executable instruction is executed by one or more processors (for example, one processor 211 in FIG. 17) to cause the computer to execute each step of the control method for the electronic cigarette in any one of the above method embodiments, or implement the functions of each module of the control device for the electronic cigarette in any one of the above device embodiments.

The embodiment of the present disclosure further provides a computer program product, the computer program product includes a computer program stored in a nonvolatile computer readable storage medium, and the computer program includes a program instruction, which, when executed by one or more processors (for example, one processor 211 in FIG. 17), causes the computer to execute each step of the control method for the electronic cigarette in any one of the above method embodiments, or implement the functions of each module of the control device for the electronic cigarette in any one of the above device embodiments.

The device embodiments described above are merely for illustration. The module described as a separate component may be or may not be physically separated; the component, displayed as a module, may be or may not be a physical unit, that is, it may be located at one place, or may be distributed on a plurality of network module units. Part or all modules may be selected to realize the purpose of the embodiment scheme according to actual needs.

Through the description of the above implementations, the ordinary skill in the art can clearly understand that each implementation can be achieved by means of software plus a common hardware platform, of course as well as through hardware. The ordinary skill in the art can understand that all or part of the processes in the above method embodiments may be implemented by instructing related hardware through a computer program which may be stored in a computer readable storage medium and which, when executed, may include, for example, the process of the embodiment of the above methods. The storage medium may be a disk, a compact disk, a Read-Only Memory (ROM) or Random Access Memory (RAM) and the like.

The above are embodiments of the present disclosure merely and are not intended to limit the patent scope of the present disclosure. Any equivalent structures or equivalent process transformation made according to the description and the accompanying drawings of the present disclosure, or any equivalent structures or equivalent flow modifications applied in other relevant technical fields directly or indirectly are intended to be included in the patent protection scope of the present disclosure.

What is claimed is:

1. A control method for an electronic cigarette, characterized in that, wherein the electronic cigarette comprises an atomizer and a power device, the atomizer is provided with an encryption authentication unit, the power device is provided with a control unit, and when the atomizer is connected to the power device, the encryption authentication unit is in communication connection with the control unit;

the electronic cigarette control method comprises:
generating a first identity authentication code;
acquiring a second identity authentication code from the encryption authentication unit;
performing identity authentication according to the first identity authentication code and the second identity authentication code, and controlling the electronic cigarette to activate if the identity authentication is passed; and
prohibiting the electronic cigarette to activate if the identity authentication is not passed, wherein the step of generating a first identity authentication code comprises:
generating a random challenge data;
acquiring prestored atomizer information from the encryption authentication unit; and
performing a calculation on the random challenge data, the prestored atomizer information and a prestored first key according to a prestored first encryption algorithm, to generate the first identity authentication code.

2. The control method according to claim 1, characterized in that, wherein the step of performing identity authentication according to the first identity authentication code and the second identity authentication code comprises:
comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

3. The control method according to claim 1, characterized in that, wherein the step of performing identity authentication according to the first identity authentication code and the second identity authentication code comprises:
comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

4. The control method according to claim 3, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

5. The control method according to claim 1, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

6. The control method according to claim 5, characterized in that, the electronic cigarette control method further comprises:
when the available amount of tobacco liquid is less than a preset threshold, controlling the electronic cigarette to stop working or controlling the electronic cigarette to give a prompt.

7. The control method according to claim 1, characterized in that, wherein the prestored atomizer information comprises manufacturer information, version information, production information and a tobacco liquid type.

8. The control method according to claim 7, characterized in that, wherein the step of performing identity authentication according to the first identity authentication code and the second identity authentication code comprises:
comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

9. The control method according to claim 7, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and updating the available amount of tobacco liquid, the available number of puffs and the available smoking duration according to the tobacco liquid consumption, the number of times of smoking and the working duration of the atomizer.

10. The control method according to claim 1, characterized in that, wherein before the step of acquiring a second identity authentication code from the encryption authentication unit, the method further comprises:
sending the random challenge data to the encryption authentication unit, so that the encryption authentication unit performs a calculation on the random challenge data, the prestored atomizer information and a prestored second key according to a prestored second encryption algorithm, to generate the second identity authentication code.

11. The control method according to claim 10, characterized in that, wherein the prestored atomizer information comprises manufacturer information, version information, production information and a tobacco liquid type.

12. The control method according to claim 10, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

13. The control method according to claim 10, characterized in that, wherein the first identity authentication code and the second identity authentication code are both information validation codes or MAC codes.

14. The control method according to claim 13, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

15. The control method according to claim 10, characterized in that, wherein the prestored first encryption algorithm and the prestored second encryption algorithm are both secure Hash algorithms.

16. The control method according to claim 15, characterized in that, wherein the step of performing identity authentication according to the first identity authentication code and the second identity authentication code comprises:
comparing the first identity authentication code with the second identity authentication code; if the first identity authentication code and the second identity authentication code are consistent, the identity authentication is passed;
if the first identity authentication code and the second identity authentication code are inconsistent, the identity authentication is not passed.

17. The control method according to claim 15, characterized in that, wherein the prestored atomizer information comprises an available number of puffs, an available smoking duration and an available amount of tobacco liquid, wherein the method further comprises:
when the electronic cigarette is controlled to activate, acquiring a number of times of smoking, a working duration of the atomizer and a working power of the atomizer;
calculating a tobacco liquid consumption according to the working duration of the atomizer and the working power of the atomizer; and
updating the available amount of tobacco liquid, the available number of puffs and the available smoking duration according to the tobacco liquid consumption, the number of times of smoking and the working duration of the atomizer.

18. An electronic cigarette, characterized in that, the electronic cigarette comprises:
an atomizer, the atomizer including an encryption authentication unit; and
a power device, the power device comprising a control unit;
wherein the atomizer is connected to the power device, and the encryption authentication unit is in communication connection with the control unit;
the control unit comprises at least one processor, and,
a memory in communication connection with the at least one processor, wherein
the memory stores an instruction that can be executed by the at least one processor, and the instruction is executed by the at least one processor so that the at least one processor can perform the method described in claim 1.

* * * * *